United States Patent [19]

Routson

[11] 4,387,995
[45] Jun. 14, 1983

[54] PORTABLE CONCRETE MIXING AND TRANSPORT APPARATUS

[76] Inventor: Edwin J. Routson, 135 N. Oakwood, West Chicago, Ill. 60185

[21] Appl. No.: 261,579

[22] Filed: May 7, 1981

[51] Int. Cl.³ .................... B28C 5/22; B28C 5/42; B28C 7/16

[52] U.S. Cl. .................................... 366/2; 366/45; 366/57; 366/60; 366/63

[58] Field of Search .................. 366/53–57, 366/60–63, 185, 188, 189, 192, 193, 220, 225, 228, 229, 230, 233, 2, 44, 47, 45, 48, 606; 298/10; 414/468, 433; 296/4; 248/128, 130

[56] References Cited

U.S. PATENT DOCUMENTS

| | | | |
|---|---|---|---|
| 557,028 | 2/1897 | Helder | 366/225 |
| 1,616,783 | 2/1927 | Calkins | 366/228 |
| 2,547,787 | 4/1951 | Siebring et al. | 366/55 X |
| 3,033,057 | 5/1962 | Gray | 366/220 X |
| 3,190,620 | 6/1965 | Saveraid | 366/606 X |
| 3,232,586 | 2/1966 | McClive | 366/55 X |
| 3,350,068 | 10/1967 | Vincendon | 366/233 X |
| 3,942,769 | 3/1976 | Whiteside et al. | 366/192 |
| 4,078,263 | 3/1978 | Campbell | 366/53 |
| 4,268,174 | 5/1981 | Falardeau | 366/606 X |

Primary Examiner—Philip R. Coe
Assistant Examiner—Frankie L. Stinson
Attorney, Agent, or Firm—Gary, Juettner & Pyle

[57] ABSTRACT

A portable concrete mixing and transport device comprises a trailer having wheels and a drum supported above the wheels, said drum being movable into and out of engagement with the wheels. Concrete mix carried in the drum is agitated by pulling the trailer with the drum in contact with the wheels, causing the drum to rotate. The drum may be tilted to allow pouring of the mix. The device allows for convenient and inexpensive transport and mixing of small quantities of concrete.

10 Claims, 6 Drawing Figures

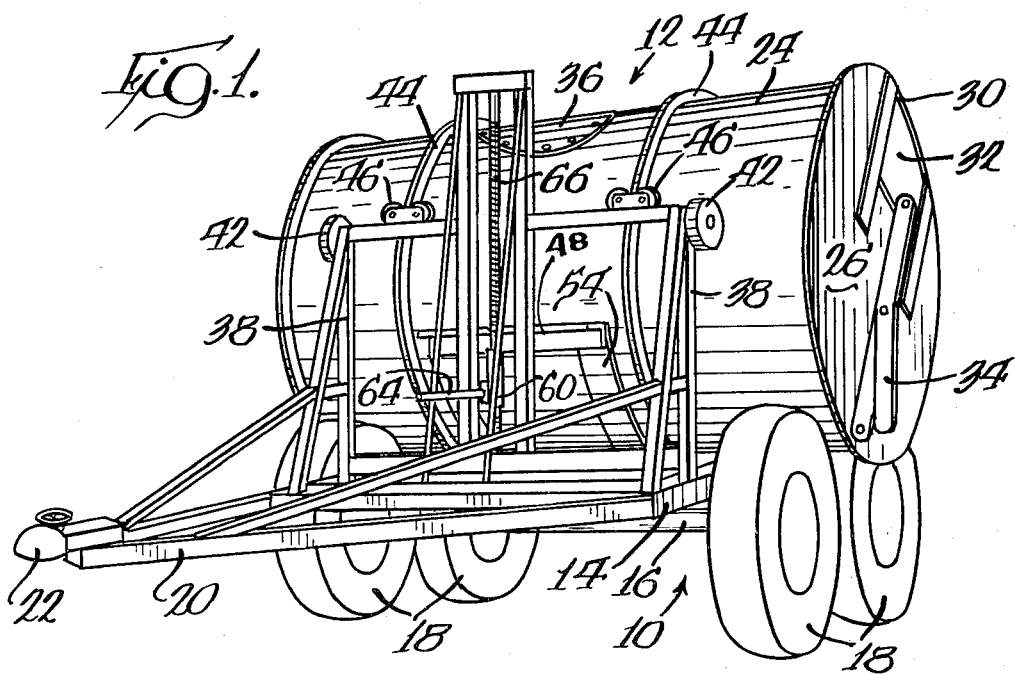
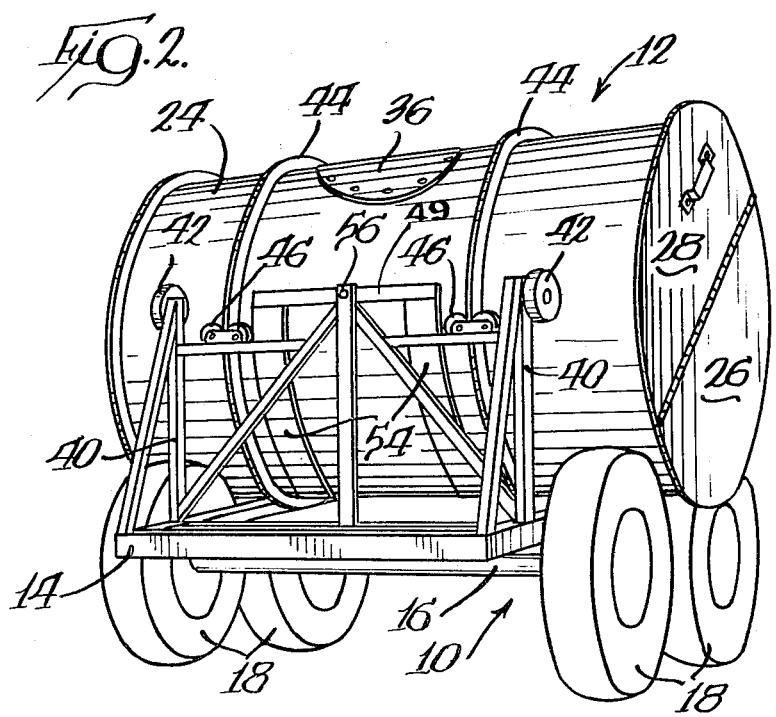

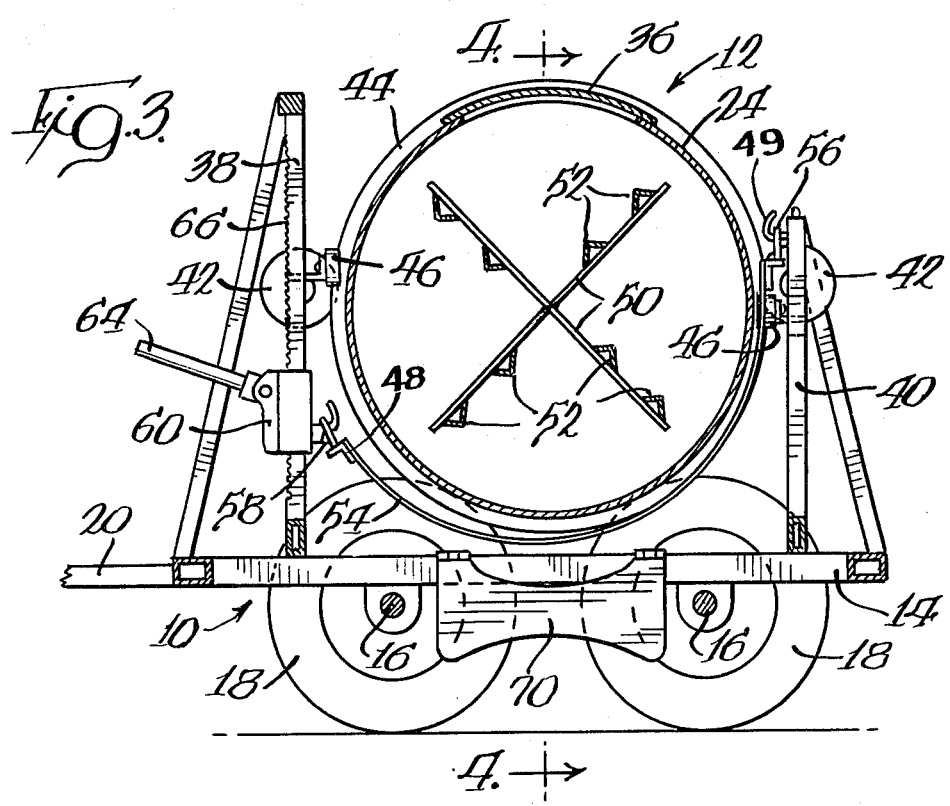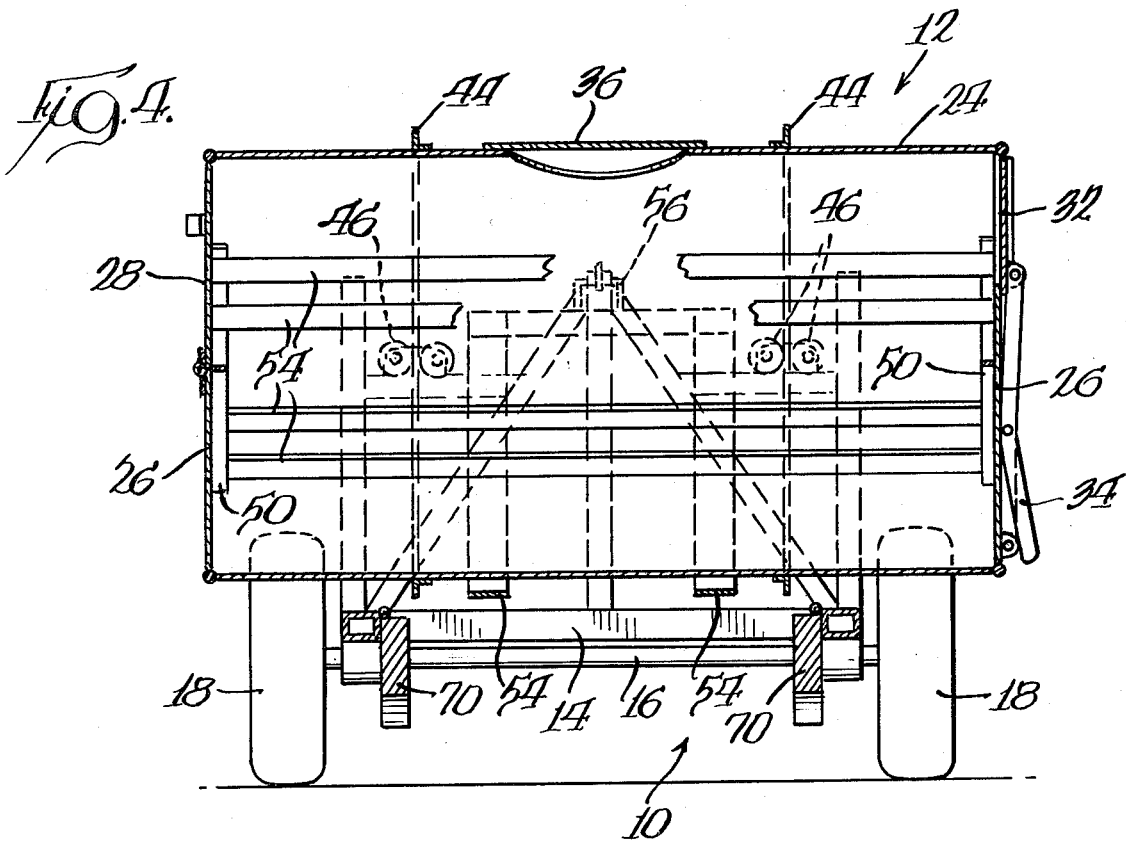

PORTABLE CONCRETE MIXING AND TRANSPORT APPARATUS

BACKGROUND OF THE INVENTION

This invention relates to concrete mixing devices and more particularly to such devices that may be easily transported to a desired location by towing with a vehicle.

Several methods for providing mixed concrete are available to the average consumer or small contractor, but none of such methods are entirely satisfactory. Small quantities of concrete may be mixed by hand or in a mixer, but the procedure is difficult, time consuming and expensive. Commercial quantities of ready mix concrete can be obtained by concrete truck, but the cost of delivery is excessive for small applications, and problems arise if not all of the concrete is to be used within a short period of time.

Another possible method for an individual to obtain concrete is to rent a trailer specifically designed for carrying mixed concrete. The trailer is filled with the mix, and the individual tows the trailer to the desired location. A major problem with such system is that the concrete tends to separate within a fairly short period of time, and the problem becomes worse if the trailer must be towed for a long distance. Also, if only a portion of the concrete is removed from the trailer for use, the remainder tends to harden before the trailer can be returned, thus creating a difficult and time consuming cleaning problem.

U.S. Pat. No. 3,232,586 describes a single wheeled drum that may be used for mixing concrete, but such apparatus is rather complicated and does not offer sufficient flexibility in operation.

SUMMARY OF THE INVENTION

The present invention comprises a trailer adapted to be towed by a vehicle. A rotatable drum is positioned above the wheels of the trailer and may be raised or lowered into and out of engagement with the wheels. The drum may be also tilted to one side to discharge the contents. A quantity of dry mix is charged into the drum, and the drum, out of contact with the wheels, is towed to the construction site. When concrete is needed at the site, a measured amount of water is added to the mix, the drum is lowered into contact with the trailer wheels, and the drum is rotated by towing the vehicle a short distance. After the desired quantity of concrete has been used, additional water and sand may be added to the drum with additional mixing, such that the remaining concrete does not adhere to the walls of the drum during return of the trailer.

The apparatus of the present invention affords numerous advantages, many of which are unique. The apparatus allows relatively small quantities of mixed concrete to delivered at low cost. The concrete may be transported, mixed and used at the convenience of the consumer, without special delivery charges or problems of separation and hardening during transport. Mixing and dispensing of the concrete is simple and less problematic than in conventional systems, and clean-up problems are minimized. Thus, the apparatus of the present invention provides a means for providing small quantities of mixed concrete of high quality at the lowest possible price and at the total convenience of the consumer.

THE DRAWINGS

FIG. 1 is a front perspective view of the portable concrete mixing and transport apparatus of the present invention.

FIG. 2 is a rear perspective view of the apparatus shown in FIG. 1.

FIG. 3 is a vertical sectional view of the apparatus shown in FIG. 1.

FIG. 4 is a sectional view taken along line 4—4 of FIG. 3.

DESCRIPTION OF THE PREFERRED EMBODIMENT

Figure 5:
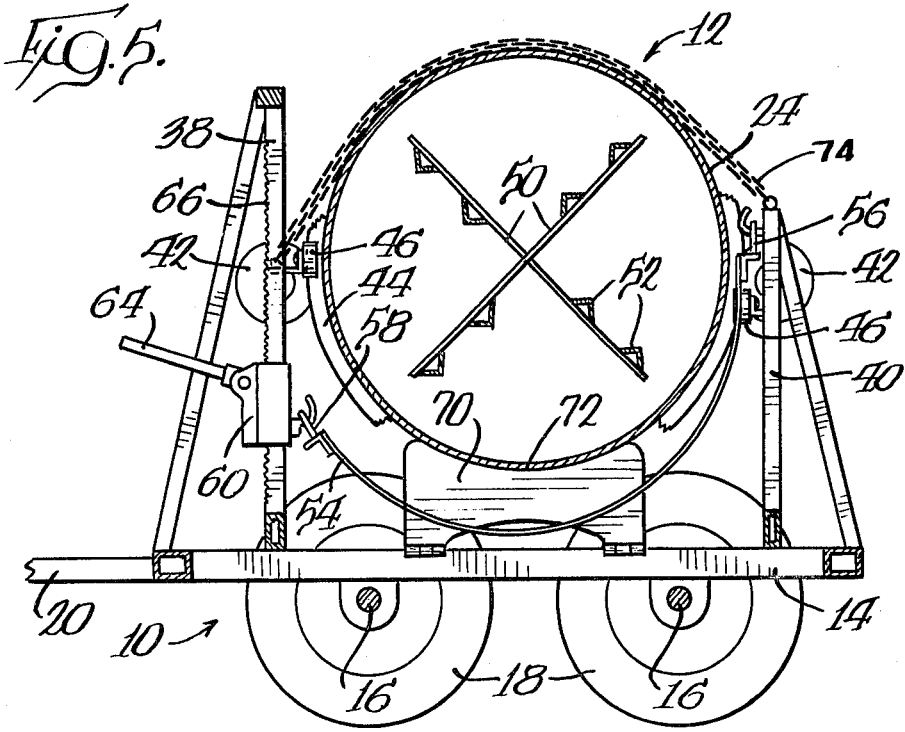
FIG. 5 is a view similar to FIG. 3 but showing the mixing drum in a raised, towing position.

As shown in the various Figures, the apparatus of the present invention generally comprises a trailer 10 upon which a concrete mixing and discharge unit 12 is mounted. The trailer is substantially conventional in nature and comprises a rectangular frame 14 supported upon a pair of axles 16, with four wheels 18 rotatably mounted on the ends of the axles. The trailer also includes the usual drawbar framework 20 terminating in a hitch 22 to enable attachment to a ball joint on the towing vehicle (not shown).

A drum 24 is supported over and between the trailer wheels, the axis of said drum being generally parallel to the axis of the axles 16. The drum is generally cylindrical in shape and has closed end walls 26. An access door 28 may be provided in one of the end walls to allow loading of solid and liquid material into the drum. A discharge chute 30 located below a sliding door 32 which is operatively connected to a pivoted handle 34 is provided in the other of the end walls to enable unloading of the mixed concrete when desired. In addition, a door 36 may be provided in the cylindrical body of the drum 24 to facilitate loading of dry materials into the drum from an overhead hopper or conveyor.

A pair of upright supports 38 and 40 extend upward from the trailer framework 14 on either side of the drum 24 and, together with the trailer frame, define a rectangular opening into which the drum is received and supported. Spaced longitudinal rollers 42 are mounted near the top of each upright support and are rotatably engageable with the cylindrical surface of the drum, in order to stabilize the drum against excessive longitudinal movement relative to the trailer.

The cylindrical surface of the drum has one or more ring-shaped flanges 44 extending outwardly from the drum surface. A pair of closely spaced, laterally opposed rollers 46, are mounted in aligned positions on each of the upright supports 38 and 40. The flange 44 of the drum projects between the pairs of laterally opposed rollers 46, which define a low friction guideway to prevent lateral shifting of drum along its axis relative to the trailer, while allowing the drum to rotate about its axis. The rollers 42 and 46 thereby prevent longitudinal and lateral shifting of the drum while allowing the drum to rotate.

Means are provided to raise and lower the drum 24 out of and into contact with the wheels or tires 18 of the trailer, and to tilt the drum into a discharge position.

FIGS. 1 through 4 show the drum 24 in the lowered or mixing position wherein the cylindrical surface of the drum rests upon each of the wheels or tires 18 of the trailer. In the lowered position, it may be seen that if the trailer is moved forward or rearward, rotation of the wheels will cause the drum to rotate in the opposite direction of the wheels. In this connection, it will be noted that the distance between adjacent wheels is substantially less than the diameter of the drum, such that the drum is substantially supported on the wheels.

As shown in FIGS. 3 and 4, agitating bars or vanes are provided in the interior of the drum to assist mixing of the concrete. Preferably, a pair of x-shaped supports 50 are secured in the ends of the drum, and the legs of the supports carry a plurality of spaced v-shaped agitating bars 52 extending parallel to the axis of the drum. The agitating bars 52 rotate with the drum and agitate the concrete mix that would otherwise tend to settle and accumulate at the bottom of the drum.

As shown in the Figures, the means for raising and lowering the drum 24 relative to the trailer comprises a curved strap 54 extending between the upright supports 38 and 40 and beneath the drum, said strap having a sufficiently side surface to support the drum in a stable fashion as shown. The respective ends of the strap are attached to a forward rigid cross-bar 48 on one end and to a rearward rigid cross-bar 49 on the other end. One cross-bar 49 is pivotally connected at 56 with a hook or similar structure on one of the upright supports 40; the other cross-bar 48 is hooked over or otherwise pivotally connected at 58 (FIG. 3) to the movable car 60 of a jack. As shown, the jack is conventional in nature and includes a lever bar 64 connected into the car 60, which includes an internal ratchet mechanism for climbing up a toothed upright support 66 when the handle is pivoted up and down. In the alternative, a hydraulic jack, cylinder or other suitable lifting mechanism may be employed.

Figure 6:
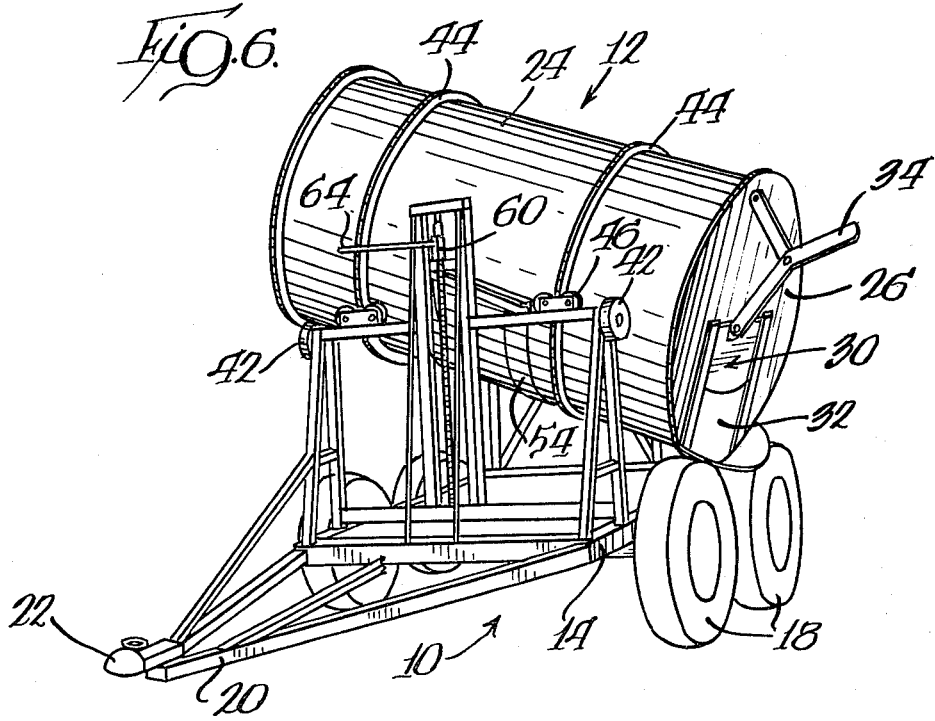
FIG. 6 is a perspective view similar to FIG. 1 but showing the drum in a tilted discharge position.

When the drum 24 is in a raised position and is spaced away from the tires of the trailer, one end of the drum may be tilted down into a discharge position, as shown in FIG. 6. This can be accomplished by virtue of the pivotal connections 56 and 58 between the cross-bars 48 and 49 and the upright supports 38 and 40. If desired, the strap 54 may be positioned slightly off center away from the discharge side of the drum to facilitate manual tilting of the drum into the discharge position.

The apparatus also includes means to cradle the drum in a stable raised position, which is the position used during transport to and from the construction site. As shown in FIG. 5, a pair of cradles 70 are pivotally mounted on opposite sides of the trailer frame 14 beneath the drum. The cradles 70 each have an upper curved recessed wall 72 corresponding to the curvature of the drum, and a lower portion hinged to the frame. When not in use, the cradles are folded inwardly so as not to be in contact with the drum when in a lowered or tilted position. In addition, a flexible line or chain 74 may be strapped over the drum when resting on the cradle for added support.

The operation of the apparatus of the present invention may now be understood. The drum 24 is first loaded with a quantity of dry concrete mix such as cement and sand. The apparatus is placed in the travel position with the drum raised and the hitch 22 is attached to a vehicle for towing to the desired location.

Upon arrival at the construction site, the drum 24 is lifted slightly and the cradles are folded inwardly. The drum 24 is then lowered onto the tires 18 in the mixing position as shown in FIGS. 1 through 3. A quantity of water is then added to the mix, which is sufficient to form concrete of the proper consistency. Although not shown, the apparatus may be provided with a self-contained water tank to provide a supply of water in remote locations.

After addition of water, the concrete is mixed by towing the apparatus slowly over a short distance, which causes the drum to rotate. When the necessary amount of mixing has been attained, the jack 64 is operated to raise the drum, and the drum is then tilted toward the discharge end 26. The mixed concrete is then discharged as needed.

After the desired amount of concrete has been used, additional water may be added and the drum rotated in order to clean the drum and prevent any remaining concrete from adhering to and hardening on the interior surfaces of the drum.

What is claimed is:

1. Apparatus for mixing and transporting concrete comprising:
   a trailer with a longitudinal axis;
   a pair of wheels rotatably mounted on said trailer and supporting said trailer for transport, said pair of wheels having a coincident axis of rotation perpendicular to the longitudinal axis of said trailer;
   a rotatable drum for holding concrete and having an axis of rotation parallel to the axis of rotation of said pair of wheels;
   support means mounted on said trailer for receiving and rotatably supporting said drum and for holding said drum in contact with said pair of wheels for rotation by said wheels;
   means between said trailer and said drum for raising and lowering said drum out of and into driving engagement with said wheels; and
   means for lifting one side of said drum to tilt said drum and discharge the concrete therefrom.

2. Apparatus as in claim 1, wherein said support means comprises:
   a second pair of wheels rotatably mounted on said trailer and supporting said trailer for transport, said second pair of wheels having a coincident axis of rotation parallel to the axis of rotation of the first pair of wheels, said drum being cradled between and supported on both pairs of wheels for rotation by both pairs of wheels.

3. Apparatus as in claim 1, said drum having a cylindrical surface concentric with its axis of rotation, said support means comprising:
   a pair of upright supports mounted on and extending upwardly from said trailer on either side of said drum and together with said trailer defining a rectangular opening, in which said drum is received;
   a plurality of spaced longitudinal rollers rotatably mounted on each of said upright supports, parallel to said drum and rotatably engaging the cylindrical surface of said drum for stabilizing said drum against longitudinal movement away from said wheels;
   a plurality of ring-shaped flanges mounted on and extending outwardly from the cylindrical surface of said drum, each ring shaped flange forming a plane normal to the axis of rotation of said drum;
   a plurality of pairs of laterally opposed rollers rotatably mounted on each of said upright supports, each pair of laterally opposed rollers defining a low friction guideway for rotatably engaging a respective one of said flanges therebetween, for stabilizing said drum against shifting in the direction of its rotational axis while allowing said drum to rotate about its axis on said wheels.

4. Apparatus as in claim 1, wherein said lifting means comprises:
a jack mounted upright on said trailer on one side of said drum and having a moveable car;
a rigid support mounted upright on said trailer on the other side of said drum;
two rigid cross-bars, extending parallel to the rotational axis of said drum and perpendicular to said jack and said rigid support, one of said cross-bars being connected to the movable car of said jack, the other said cross-bar connected to said rigid support;
a plurality of curved straps extending between said cross-bars and beneath said drum, the respective ends of said straps being attached respectively to said cross-bars, for lifting said drum out of contact with said wheels when the moveable car of said jack is jacked upwardly.

5. Apparatus as in claim 4, further comprising:
pivot means for pivotally connecting said one cross-bar to the moveable car of said jack; and
a second pivot means for pivotally connecting said other cross-bar to said rigid support, both of said pivot means acting in cooperation to accommodate tilting said drum when the same has been lifted free from contact with said wheels.

6. Apparatus as in claim 1, further comprising:
a cradle hingeably mounted on said trailer and hingeably movable into and out of engagement with said drum, said cradle when engaged with said drum supporting said drum on said trailer above said wheels, and when out of engagement said cradle hanging from said trailer out of contact with all rotating elements.

7. Apparatus for mixing and transporting concrete comprising:
a trailer frame with a longitudinal axis;
two axels mounted on said trailer frame parallel to each other, perpendicular to the longitudinal axis of said trailer frame and in the same plane as formed by said trailer frame;
four rubber tired wheels rotatably mounted on the four respective ends of said two axels and supporting said axels and said trailer frame for transport;
a cylindrical steel drum having an axis of rotation parallel to said axels, longer in length than said axels and having a diameter greater than the distance between the wheels on each side of said trailer, cradled between and supported on said four wheels for rotation by the same;
a forward support frame mounted on and extending upwardly from said trailer on the forward side, in a longitudinal direction, of said drum;
a rearward support frame mounted on and extending upwardly from said trailer on the rearward side, in a longitudinal direction of said drum;
four longitudinal rollers, parallel to said drum and rotatably engaging the cylindrical surface of said drum at its vertical mid-point, two longitudinal rollers rotatably mounted spaced apart on the top of said forward support frame, the other two longitudinal rollers rotatably mounted spaced apart on the top of said rearward support frame, for stabilizing said drum against longitudinal movement away from said wheels;
two ring-shaped flanges mounted on and extending outwardly from the cylindrical surface of said drum, each ring shaped flange forming a plane normal to the axis of rotation of said drum;
four pairs of laterally opposed rollers having axes of rotation perpendicular to the axis of rotation of said drum, two pairs being rotatably mounted on said forward upright support, the other two pairs being rotatably mounted on said rearward upright support, each pair of laterally opposed rollers defining a low friction guideway for rotatably engaging a respective one of said flanges therebetween, for stabilizing said drum against shifting in the direction of its rotational axis which allowing said drum to rotate about its axis on said wheels;
a mechanical jack having a base mounted on said trailer frame, having a toothed upright support connected to said forward upright support and having a movable car which includes an internal ratchet mechanism for climbing up the toothed upright support;
a forward rigid cross-bar extending parallel to the rotational axis of said drum and perpendicular to the toothed upright support of said jack being pivotally connected to the movable car of said jack;
a rearward rigid cross-bar extending parallel to said forward cross-bar being pivotally connected to said rearward upright support;
two spaced apart curved steel straps extending between said forward and said rearward cross-bars and beneath said drum, one end of each said strap being attached to said forward cross-bar, the other end of each said strap being connected to said rearward cross-bar, for lifting said drum out of contact with said wheels when the movable car of said jack is jacked up the toothed upright support of said jack; and
two cradles hingeably mounted spaced apart on said trailer frame parallel to each other and hingeably moveable into and out of engagement with said drum, said cradles when engaged with said drum forming a semi-cylindrical surface with an axis parallel to the rotational axis of said drum, beneath said drum for supporting said drum on said trailer frame above said wheels, and when out of engagement said cradle hanging from said trailer out of contact with all rotating elements.

8. Apparatus as in claim 1, wherein said drum comprises:
a cylinder having closed end walls;
an inlet door in said cylinder for facilitating loading the concrete into said cylinder;
an access door in one end wall for access to facilitate maintenance or to facilitate loading the concrete into said cylinder;
a sliding door in the other end wall;
a discharge chute mounted on the other end wall below said sliding door and cooperating with said sliding door in order to facilitate discharge of the concrete from said cylinder; and
a plurality of agitating bars mounted on one end to the interior surface of one end wall and on the other end, mounted to the interior surface of the other end wall, said plurality of agitating bars parallel to each other and parallel to rotational axis of said cylinder, for agitating the concrete when the cylinder is rotated.

9. A method of transporting and mixing concrete, which comprises:
- placing a predetermined amount of dry concrete mix into a cylindrical drum which is mounted on a trailer having four wheels;
- towing the trailer to the site where the concrete is to be used with the drum out of engagement with the wheels;
- placing a predetermined amount of water into the drum at the site where the concrete is to be used; and then
- engaging the drum into rotatable contact with said wheels and towing the trailer so that the wheels rotate the drum and mix the concrete mix with the water; and then
- tilting the drum to one side of the trailer to discharge desired quantity of mixed concrete.

10. Concrete mixing and transport device comprising a trailer having ground engaging wheels, a rotatable concrete containing and mixing means supported on said trailer above said wheels, means between said trailer and said concrete containing and mixing means for raising and lowering said concrete containing and mixing means out of and into rotatable driving engagement with said wheels, and means for raising one end of said containing and mixing means to discharge mixed concrete therefrom.

* * * * *